United States Patent
Liu et al.

(10) Patent No.: US 10,310,089 B2
(45) Date of Patent: Jun. 4, 2019

(54) METHOD AND APPARATUS FOR UPDATING AND PROVIDING SATELLITE NAVIGATION MESSAGE

(71) Applicant: Marvell World Trade Ltd., St. Michael (BB)

(72) Inventors: BoChih Liu, Shanghai (CN); Zhike Jia, Fremont, CA (US); Jian Chen, Shanghai (CN); Zhicui Lu, Shanghai (CN); Juhong Xing, Shanghai (CN); Feng Xu, Milpitas, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 569 days.

(21) Appl. No.: 15/073,150

(22) Filed: Mar. 17, 2016

(65) Prior Publication Data

US 2016/0282469 A1    Sep. 29, 2016

Related U.S. Application Data

(60) Provisional application No. 62/138,056, filed on Mar. 25, 2015.

(51) Int. Cl.
*G01S 19/05* (2010.01)

(52) U.S. Cl.
CPC ................. *G01S 19/05* (2013.01)

(58) Field of Classification Search
CPC ....................................................... G01S 19/05
See application file for complete search history.

(56) References Cited

U.S. PATENT DOCUMENTS

| | | | |
|---|---|---|---|
| 6,861,980 B1* | 3/2005 | Rowitch | G01S 19/05 342/357.31 |
| 8,680,987 B1* | 3/2014 | Okmyanskiy | G01S 19/05 340/426.19 |
| 2003/0207681 A1* | 11/2003 | Rowitch | G01S 19/05 455/404.2 |
| 2011/0032146 A1* | 2/2011 | Halivaara | G01S 19/05 342/357.64 |
| 2011/0163914 A1* | 7/2011 | Seymour | G01S 19/05 342/357.42 |

* cited by examiner

*Primary Examiner* — Bernarr E Gregory
*Assistant Examiner* — Fred H Mull (57) ABSTRACT

Aspects of the disclosure include a method for sharing satellite navigation messages. The method includes receiving a download report from a receiver. The download report indicates what portions of a satellite navigation message are currently stored by the receiver. The method also includes determining whether to update a satellite navigation message database associated with a server based on the portions of the satellite navigation message stored by the receiver. In response to determining that the satellite navigation message database should be updated, the method further includes requesting the receiver to transmit a subset of the satellite navigation message currently stored by the receiver to the server; receiving the subset of the satellite navigation message; and updating the satellite navigation message database associated with the server based on the received subset of the satellite navigation message.

20 Claims, 5 Drawing Sheets

METHOD AND APPARATUS FOR UPDATING AND PROVIDING SATELLITE NAVIGATION MESSAGE

INCORPORATION BY REFERENCE

This present disclosure claims the benefit of U.S. Provisional Application No. 62/138,056, "IMPROVEMENT ON SENSITIVITY OF GNSS RECEIVER UNDER WEAK SIGNAL BACKGROUND" filed on Mar. 25, 2015, which is incorporated herein by reference in its entirety.

FIELD

This disclosure relates generally to satellite-based positioning system. More specifically, the disclosure relates to methods and apparatus for updating and providing a satellite navigation message to augment the sensitivity of a satellite positioning receiver.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a satellite-based positioning system, a satellite positioning receiver receives broadcasted satellite navigation messages from multiple satellites detectable by the receiver and determines an estimated position of the receiver with respect to the broadcasting satellites based on the received satellite navigation messages. An indicator of the sensitivity of satellite positioning receiver is the Time-to-First-Fix (TTFF). The TTFF measures how long it takes a receiver being activated to first output of an estimated position under a variety of conditions. In some applications, a significant portion of TTFF is spent in acquiring the satellite signals by the receiver's radio frequency section, and an additional time is spent in decoding the navigation message portion of the satellite signal to extract satellite navigation information (i.e., satellite position and clock state information) by the digital section. In many applications, the environmental conditions may limit the sensitivity of a satellite positioning receiver. For example, in limited sky-view conditions where the satellite signals are weak or in a twinkle, the satellite positioning receiver, due to the relationship between data error rate and signal carrier to noise ratio (CNR), is hard to correctly decode the navigation message portion of the satellite signal so the receiver is difficult of determining which satellites to search for, thereby increasing total processing time substantially.

SUMMARY

Aspects of the disclosure include a method for sharing satellite navigation messages. The method includes receiving a download report from a receiver that indicates what portions of a satellite navigation message are currently stored by the receiver. The receiver receives the portions of the satellite navigation message from a satellite. The method also includes determining whether to update a satellite navigation message database associated with a server based on the portions of the satellite navigation message stored by the receiver. When a determination result indicates that the satellite navigation message database should be updated using a subset of the satellite navigation message currently stored by the receiver, the method further includes requesting the receiver to transmit the subset of the satellite navigation message currently stored by the receiver to the server; receiving the subset of the satellite navigation message from the receiver by the server; and updating the satellite navigation message database associated with the server based on the received subset of the satellite navigation message from the receiver.

In an embodiment, determining whether to update the satellite navigation message database associated with the server based on the portions of the satellite navigation message stored by the receiver further includes determining whether a satellite navigation message, stored in the satellite navigation message database and corresponding to the satellite, has expired or will expire within a first predetermined period of time.

In an embodiment, the method further includes requesting the receiver to transmit another download report when the satellite navigation message, stored in the satellite navigation message database and corresponding to the satellite, will expire within a second predetermined period of time. In an embodiment, the method further includes requesting the receiver to periodically transmit a latest download report.

Aspects of the disclosure provide a device. The device includes a controller and a storage device that stores a satellite navigation message database. The controller receives a download report from a receiver that indicates what portions of a satellite navigation message are currently stored by the receiver, where the receiver receives the portions of the satellite navigation message from a satellite. The controller determines whether to update the satellite navigation message database based on the portions of the satellite navigation message stored by the receiver. When a determination result indicates that the satellite navigation message database should be updated using a subset of the satellite navigation message currently stored by the receiver, the controller further requests the receiver to transmit the subset of the satellite navigation message currently stored by the receiver to the apparatus; receives the subset of the satellite navigation message from the receiver; and updates the satellite navigation message database based on the received subset of the satellite navigation message from the receiver.

In an embodiment, the controller further determines that the satellite navigation message database is to be updated based on the portions of the satellite navigation message stored by the receiver when the satellite navigation message database does not store a satellite navigation message corresponding to the satellite as indicated in the download report.

Aspects of the disclosure provide a system. The system includes a receiver and a server. The receiver receives portions of a satellite navigation message from a satellite; and transmits a download report that indicates the portions of the satellite navigation message currently stored by the receiver. The server receives the download report from the receiver; and determines whether to update a satellite navigation message database associated with the server based on the portions of the satellite navigation message stored by the receiver. When a determination result indicates that the satellite navigation message database should be updated using a subset of the satellite navigation message currently stored by the receiver, the controller further requests the receiver to transmit the subset of the satellite navigation message currently stored by the receiver to the server; receives the subset of the satellite navigation message from the receiver; and updates the satellite navigation message database based on the received subset of the satellite navigation message from the receiver.

Aspects of the disclosure include a method for the provision of satellite navigation messages of aid. The method includes sending, from a receiver, a request for the provision of satellite navigation messages of aid to the server. In some embodiments, sending a request together with the download report for retrieving a satellite navigation message indicated in the download report as not currently stored by the receiver. In some embodiments, sending a request for retrieving a satellite navigation message when the receiver determines that the current navigation message stored in the receiver is invalid or expires. In some embodiments, sending a request on a periodic basis. The method also includes receiving a satellite navigation message from a server. In some embodiments, transmitting, in response to the request, the portion of the satellite navigation message indicated in the download report as not currently stored by the receiver. In some embodiments, transmitting, in response to the request the satellite navigation message for the entire satellite constellation. The method further includes checking the valid period of time for the received satellite navigation message, updating the current navigation message stored in the receiver, predicting and re-constructing the navigation data of any future epoch using the updated navigation message at specific time interval, based on corresponding relation between the navigation data and the time of satellite transfer according to well known re-construction algorithms, and calculating Doppler data from the navigation data of any future epoch stored in the receiver at a convenient time for performing a position fix according to well known techniques.

An advantage of the present disclosure is that the provision of satellite navigation messages of aid from the server may be used at the receiver for deriving approximate Doppler information for satellites in view based on the navigation data prediction and re-construction. Estimating the Doppler information reduces Doppler search time, thereby reducing TTFF and improving signal tracking sensitivity and stability.

Another advantage of the present disclosure is that the provision of satellite navigation messages of aid from the server may be used at the receiver for performing long time integration in signal tracking loop to enhance the ability of anti-multipath.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
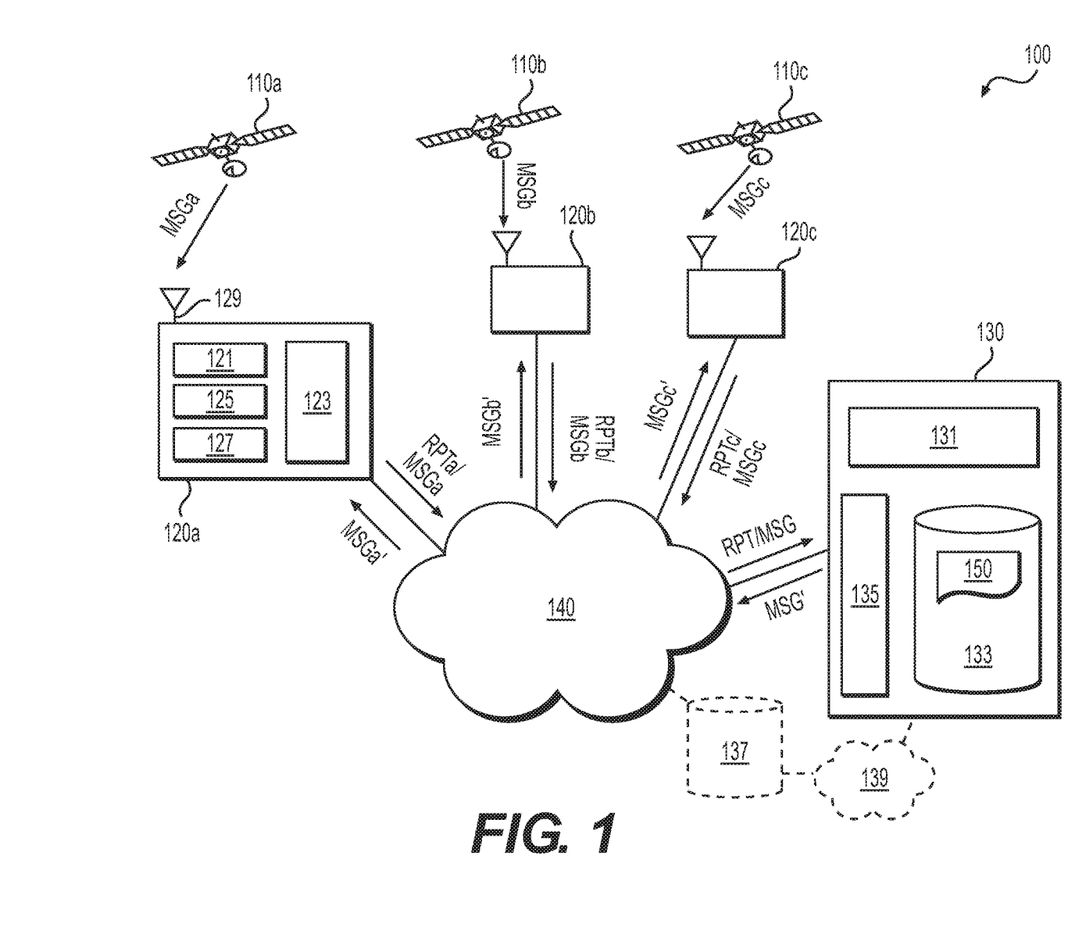
FIG. 1 shows a diagram of a positioning system example 100 according to an embodiment of the disclosure.

FIG. 1 shows a diagram of a positioning system example 100 according to an embodiment of the disclosure. The positioning system 100 includes satellites 110a-110c, satellite positioning receivers (or "receivers" in this disclosure) 120a-120c, a server 130, and a data network 140. A satellite navigation message database 150 is stored in a storage device in the positioning system 100 and is associated with the server 130. In some embodiments, the satellites 110a-110c and the receivers' 120a-120c are compatible with the standards of one or more satellite positioning systems, including U.S. Global Positioning System (GPS), Russian Global Navigation Satellite System (GLONASS), EU Galileo system, Chinese BeiDou-2 System, or the like.

In the FIG. 1 example, each one of the satellites 110a, 110b, and 110c orbits the Earth along a predetermined orbit and broadcasts a respective navigation message MSGa, MSGb, or MSGc to the surface of the planet. For an example of GPS, each satellite transmits an L-band carrier signal modulated by data bits of twenty milliseconds that spread by a pseudo-random (PRN) code. Each bit of a unique PRN code 1023 bits long represents a time mark about every microsecond, corresponding to a distance of about 300 meters. The entire PRN code sequence repeats once every millisecond, corresponding to a distance of about 300 kilometers. Every 20th cycle, or twenty milliseconds, the entire PRN code sequence may change phase and is used to encode navigation data at a 50 bits per second and to generate a 6000 kilometers range marker. The 50 bits per second binary data is used to encode a 1500 bit long navigation message. A navigation message MSGa, MSGb, or MSGc in each satellite signal includes time information, orbit information, and health information with respect to the broadcasting satellite.

In the FIG. 1 example, each one of the receivers 120a, 120b, and 120c can receive broadcasted satellite navigation message once the satellite signal is acquired. For example, when a particular satellite 110a, 110b, or 110c is visible to a receiver 120a, 120b, or 120c, the receiver 120a, 120b, or 120c acquires the satellite signal to receive satellite navigation message MSGa, MSGb, or MSGc broadcasted from the satellite 110a, 110b, or 110c, and the satellite is thus considered as detectable by the receiver. In some embodiments, the receiver 120a, 120b, or 120c acquires satellite signals to receive broadcasted satellite navigation messages for multiple satellites that are detectable by the receiver. It should be noted that the actual speed with which any particular receiver acquires the satellite signals to receive broadcasted satellite navigation message is strongly relies on its design, its location, and its environment.

In the FIG. 1 example, when a receiver 120a, 120b, or 120c is first turned on (known as a "cold start") or woken up from a long stand-by condition of more than a few hours, the receiver may scan the satellite spectrum to acquire a satellite signal transmitted from an available satellite. Once the satellite signal is acquired, the receiver may receive broadcasted satellite navigation message and extract the navigation data by decoding a set of digitally coded information. For an example of GPS, the navigation data includes two types of orbital data for determining the location in space for the satellite known as ephemeris orbital data and almanac orbital data. The ephemeris orbital data provides an accurate indication of the position of the satellite above the Earth at any given time that is spread over a 1500 bit long navigation message, requiring the receiver to spend up to thirty seconds to extract all the necessary ephemeris orbital data. The almanac orbital data provides less accurate information regarding the position of all the satellites in the constellation. The complete almanac orbital data for all the satellite constellation is broadcast from each of the satellites in twenty-five navigation message, updating the almanac orbital data directly from the satellites requires that the receiver be in clear view of at least one of the satellites and be powered on for a twelve and one-half minute cycle to extract the current almanac orbital data for all the satellite constellation. In a typical operation example, given sufficient time and assuming the environmental conditions surrounding the receiver allow the receiver to receive broadcasted satellite navigation messages from three to four detectable satellites, the receiver may receive both distance and time information from three to four detectable satellites and calculate its position on Earth.

An example data format 200 of a satellite navigation message according to the present disclosure will be described in detail in conjunction with FIG. 2.

In the FIG. 1 example, each one of the receiver 120a, 120b, and 120c can transmit a download report RPTa, RPTb, and RPTc (also collectively referred to as RPT) corresponding to a broadcasted satellite navigation message to the server 130 through the data network 140. A download report RPTa, RPTb, or RPTc includes information indicating what portions of the broadcasted satellite navigation message MSGa, MSGb, or MSGc are currently stored by the respective receiver. In some embodiments, a download report RPTa, RPTb, or RPTc also includes a satellite identifier indicating the satellite from which the broadcasted satellite navigation message is received.

An example download report 300 according to the present disclosure will be described in detail in conjunction with FIG. 3.

In the FIG. 1 example, each one of the receiver 120a, 120b, and 120c can retrieve one or more satellite navigation messages MSGa', MSGb', or MSGc' from a satellite navigation message database associated with the server 130. In some examples, both time and environmental conditions may limit a receiver's ability to receive broadcasted satellite navigation message successfully, especially in limited sky-view conditions where the satellite signals are weak or in a twinkle. In such a situation, the receiver may send a request to the server 130, and, in response to the request, the server 130 may transmit the requested satellite navigation message MSGa', MSGb', or MSGc' to the receiver in order to expedite the positioning process. In some embodiments, the receiver 120a, 120b, or 120c may transmit a request together with the download report for retrieving a satellite navigation message stored in the satellite navigation message database 150 associated with the server 130, and the server 130 transmits the portion of the satellite navigation message indicated in the download report as not currently stored by the receiver 120a, 120b, or 120c.

Moreover, the server 130 can receive the download reports RPT from the receiver 120a, 120b, and 120c through the data network 140 and can determine whether the satellite navigation message database 150 associated with the server 130 should be updated based on the broadcasted satellite navigation messages stored by the receiver 120a, 120b, and 120c. If the server 130 determines that the navigation message database should be updated based on a whole or a portion of a broadcasted satellite navigation message MSGa, MSGb, or MSGc according to the information provided by the respective download report RPTa, RPTb, or RPTc, the server 130 requests the receiver 120a, 120b, or 120c to transmit at least a subset of the broadcasted satellite navigation message currently stored by the respective receiver 120a, 120b, or 120c. After the server 130 receives the requested subset of the broadcasted satellite navigation message MSGa, MSGb, or MSGc from the respective receiver 120a, 120b, or 120c through the data network 140, the server 130 updates the satellite navigation message database 150 associated with the server 130 based on the received subset of the broadcasted satellite navigation message.

The data network 140 may include one or more of wireless network according to wireless communication protocols such as Global System for Mobile communication (GSM), Code Division Multiple Access (CDMA), Wideband Code Division Multiple Access (WCDMA), Time Division Synchronous Code Division Multiple Access (TD-SCDMA), Long Term Evolution (LTE), Time Division Long Term Evolution (TD-LTE); Institute of Electrical and Electronics Engineers (IEEE) 802.11 based protocol, IEEE 802.15 based protocol, and the like; or one or more of wired network according to wired communication protocols such as ETHERNET, Universal Serial Bus (USB), IEEE-1394, and the like.

In the FIG. 1 example, the receiver 120a includes a controller 121, a storage device 123, a network interface 125, a satellite positioning circuit 127, and an antenna 129. The receiver 120a may correspond to a mobile device, such as a laptop computer, tablet computer, smart phone, wearable electronic device, and the like. In some examples, the receiver 120a may correspond to a stationary device disposed at a predetermined location. In some example, the receivers 120b and 120c have a configuration similar to that of the receiver 120a.

In one example, when the receiver 120a is a stationary device, the antenna 129 of the receiver 120a may be placed at a location that has a desirable reception condition in order to maximize the completeness of the broadcasted satellite navigation messages detectable by the receiver 120a. In yet another example, two or more of the receivers 120a, 120b, and 120c may be positioned to focus on receiving satellite signals to receive broadcasted satellite navigation messages from respective, non-overlapped portions of the sky.

In some embodiments, because the receivers 120a, 120b, and 120c may correspond to tens of thousands of mobile devices, the number of stationary receivers may be reduced, and the cost of setting up and maintaining stationary receivers may be reduced. Also, with the information sharing from the tens of thousands of mobile devices, the satellite navigation message database 150 may always have sufficient sources for obtaining the most up-to-date satellite navigation messages.

The controller 121 is configured to interact with the storage device 123, the network interface 125, and the satellite positioning circuit 127. The controller 121 may generate a download report RPT based on a whole or a portion of the broadcasted satellite navigation messages MSG received by the satellite positioning circuit 127, and transmit the download report RPT to the server 130 through the network interface 125. The controller 121 may transmit a subset of the broadcasted satellite navigation messages MSG to the server 130 upon the request of the server 130. In some applications, the controller 121 may retrieve a satellite navigation message MSG' from the server 130. In some embodiments, the controller 121 may be implemented as a hardware circuit, a processor executing instructions, or a combination thereof.

The storage device 123 is used to store the broadcasted satellite navigation messages MSG received by the satellite positioning circuit 127, the retrieved satellite navigation messages MSG', the download report RPT, or other data or intermediate data for the controller 121. In some embodiments, storage device 123 includes a non-transitory computer readable medium, such as a semiconductor or solid-state memory, a random access memory (RAM), a read-only memory (ROM), a hard disk, an optical disk, or other suitable storage medium. In some embodiments, storage device 123 includes a plurality of non-transitory computer readable mediums listed above.

The network interface 125 is configured to be compatible with the network protocol of the data network 140 in order to facilitate data communication between the receiver 120a and the server 130 through the data network 140.

The satellite positioning circuit 127 is configured to acquire and track the satellite signals to receive broadcasted satellite navigation messages MSG from the satellites 110a-110c via the antenna 129. In some embodiments, the satellite positioning circuit 127 is also configured to extract the navigation data by decoding a set of digitally coded navigation messages MSG and calculate the receiver's position on Earth based on the parametric feature modeling technology using the navigation data. In some embodiments, the satellite positioning circuit 127 may be implemented as a hardware circuit, a processor executing instructions, or a combination thereof.

Operations of the receiver 120a-120c according to the present disclosure will be described in detail in conjunction with FIG. 5.

In the FIG. 1 example, the server 130 includes a controller 131, a storage device 133, and a network interface 135. In some embodiments, the server 130 may further include a network storage device 137 that is accessible to the controller through the data network 140 or a network 139 different from the data network 140.

The controller 131 is configured to receive download reports RPTs from the receivers 120a-120c through the network interface 135 and to determine whether a satellite navigation message database 150 should be updated based on the broadcasted satellite navigation messages MSG stored by the receivers 120a-120c. The controller 131 may also transmit the stored satellite navigation messages MSG' in response to the requests from the receivers' 120a-120c. In some embodiments, the controller 131 may be implemented as a hardware circuit, a processor executing instructions, or a combination thereof.

The storage device 133 or the network storage device 137 is used to store the satellite navigation message database 150 or other data or intermediate data for the controller 131. The storage device 133 or the network storage device 137 may include a non-transitory computer readable medium, such as a semiconductor or solid-state memory, a random access memory (RAM), a read-only memory (ROM), a hard disk, an optical disk, or other suitable storage medium. In some examples, the storage device 133 or the network storage device 137 includes a plurality of non-transitory computer readable mediums listed above.

The network interface 135 is configured to be compatible with the network protocol of the data network 140 in order to facilitate data communication between the server 130 and the receivers' 120a-120c and/or the network storage device 137 through the data network 140. In some examples, the network interface 135 is also configured to be compatible with the network protocol of the network 139 in order to facilitate data communication between the server 130 and the network storage device 137. The network 139 may include a wireless network or a wired network similar to those illustrated above with regard to the data network 140.

In some embodiments, the satellite navigation messages are stored in the satellite navigation message database 150 in a raw data format. Therefore, the server 130 does not need to be capable of decoding the content in the stored satellite navigation messages. As such, the complexity of the server may be simplified and the corresponding maintenance expenses may be reduced.

Operations of the server 130 according to the present disclosure will be described in detail in conjunction with FIG. 4.

Figure 2:
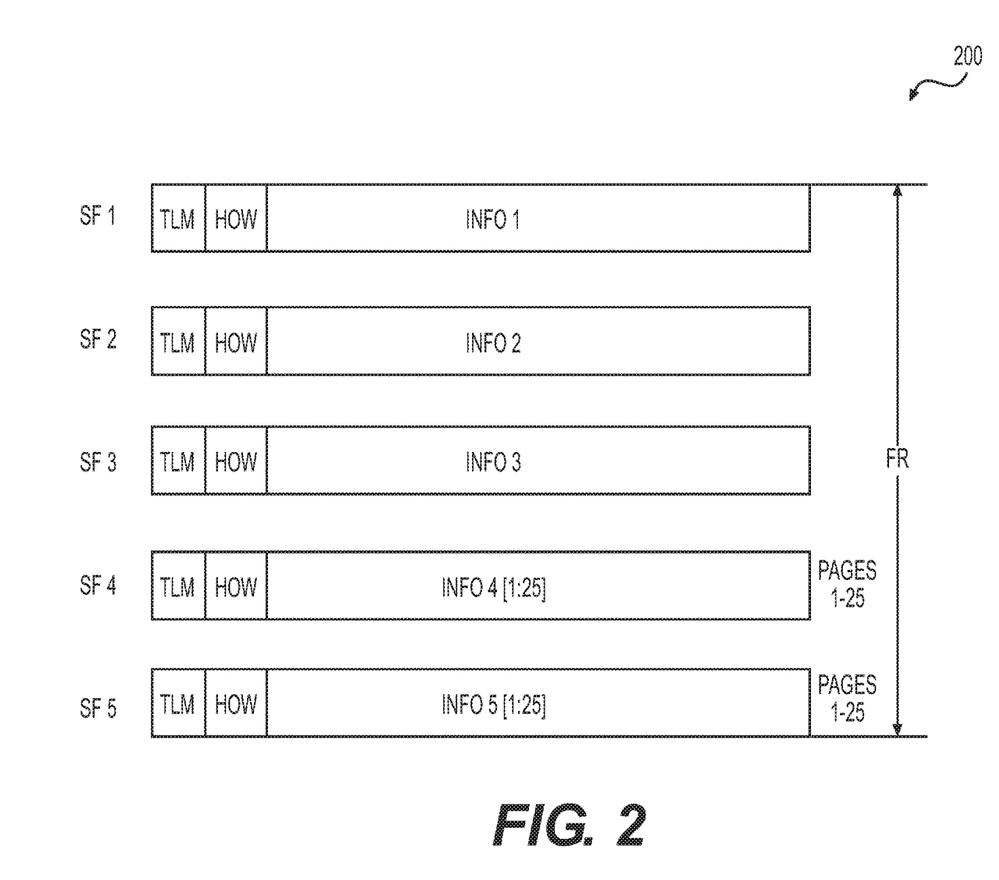
FIG. 2 shows an example data format 200 of a satellite navigation message according to an embodiment of the disclosure.

FIG. 2 shows an example data format 200 of a satellite navigation message, such as broadcasted satellite navigation messages MSGa, MSGb, and MSGc in FIG. 1, according to an embodiment of the disclosure. The data format 200 complies with the GPS standard and is illustrated as an example. Other data formats comply with other satellite positioning system standards are within various contemplated embodiments. In many applications, a satellite navigation message would include at least the almanac of the constellation of the satellite positioning system and the ephemeris of a satellite.

A satellite navigation message according to the data format 200 includes 25 data frames FRs, and each data frame FR includes 1,500 bits arranged as sub-frames SF1-SF5. Each sub-frame SF1-SF5 has 300 bits and begins with a telemetry word TLM, followed by a handover word HOW and an information section INFO1-INFO5. The satellite navigation message according to the GPS standard is transmitted at a data rate of 50 bits per second. Accordingly, complete transmission of a frame FR takes 30 seconds, and complete transmission cycle of a satellite navigation message takes 750 seconds (i.e., 12.5 minutes).

The telemetry word TLM includes data bits that identify the beginning of a sub-frame SF1-SF5. The handover word HOW includes GPS time information and a sub-frame ID that identifies which sub-frame in a complete frame FR the current sub-frame is.

The information section INFO1 of the first sub-frame SF1 includes GPS date information (e.g., GPS week number), information to correct the broadcasting satellite's time to GPS time, satellite status and health, and other information. The information section INFO1 is identically repeated in each frame FR of a complete satellite navigation message cycle from the broadcasting satellite.

The information section INFO2 of the second sub-frame SF2 and the information section INFO3 of the third sub-frame SF2 together provide the broadcasting satellite's ephemeris. According to the GPS standard, the ephemeris includes information corresponding to the satellite orbit and clock status of the broadcasting satellite. The information sections INFO2 and INFO3 are identically repeated in each frame FR of a complete satellite navigation message cycle from the broadcasting satellite. In some examples, the received ephemeris is valid up to four hours and is periodically updated by the broadcasting satellite.

The information section INFO4[1:25] of the fourth sub-frame SF4 and the information section INFO5[1:25] of the fifth sub-frame SF5 of each frame FR together provide ¹⁄₂₅th (i.e., also known as a page among 25 pages) of the almanac of the constellation of the GPS system and other support data. The almanac includes information corresponding to coarse orbits of all satellites in the constellation. The transmission of a complete set of the almanac takes at least 25 frames. In some examples, the broadcasted almanac is valid up to 180 days and is periodically updated by the broadcasting satellite.

Figure 3:
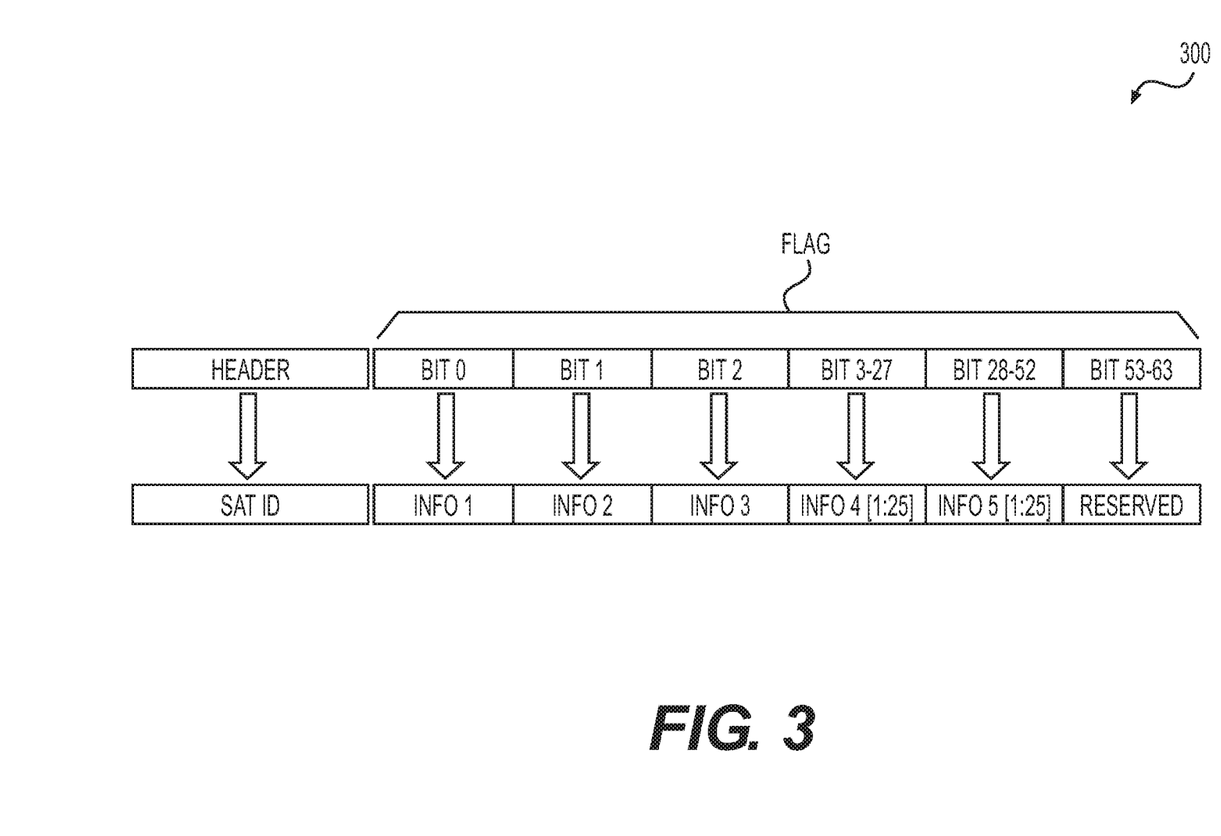
FIG. 3 shows an example download report 300 according to an embodiment of the disclosure.

FIG. 3 shows an example download report 300 according to an embodiment of the disclosure. The download report 300 includes a header section HEADER and a flag section FLAG. In some example, the download report 300 includes one or more data fields other than the header section HEADER and the flag section FLAG.

The flag section FLAG includes a plurality of bits, such as 64 bits in the example depicted in FIG. 3 that is used as flags to indicate what portions of a broadcasted satellite navigation message are currently stored by the reporting receiver 120a-120c. For example, the flag section FLAG may use one bit (Bit 0) to indicate presence or absence of the information section INFO1 of the first sub-frame SF1; one bit (Bit 1) to indicate presence or absence of the information section INFO2 of the second sub-frame SF2; and one bit (Bit 2) to indicate presence or absence of the information section INFO3 of the third sub-frame SF3. Also, the flag section FLAG may use 25 bit (Bit 3~27) to indicate presence or absence of each page of the information section INFO4[1:25] of the fourth sub-frame SF4; and 25 bit (Bit 28~52) to indicate presence or absence of each page of the information section INFO5[1:25] of the fifth sub-frame SF5. In the example depicted in FIG. 3, Bit 53~63 of the flag section FLAG is reversed and not discussed in this disclosure.

The flag section FLAG in FIG. 3 is illustrated as an example. The number of bits used as flags, the order of the bits, and the data fields in a broadcasted satellite navigation message to which the flags correspond to may vary in different embodiments or for different satellite navigation messages based on various satellite positioning system standards.

The header section HEADER includes a satellite identifier SAT ID of a satellite that broadcasted the satellite navigation message. In some embodiments, the server 130 is capable of determining to what satellite the download report 300 corresponds based on a predetermined control message protocol, and the header section HEADER thus can be omitted.

Furthermore, in some embodiments, the server 130 can also send a request to a receiver 120a-120c that includes information arranged in a format similar to that of the download report 300 in order to specifically request for the sharing of the specified information sections INFO1, INFO2, INFO3, INFO4[1:25], or INFO5[1:25] from the corresponding receiver 120a-120c.

Figure 4:
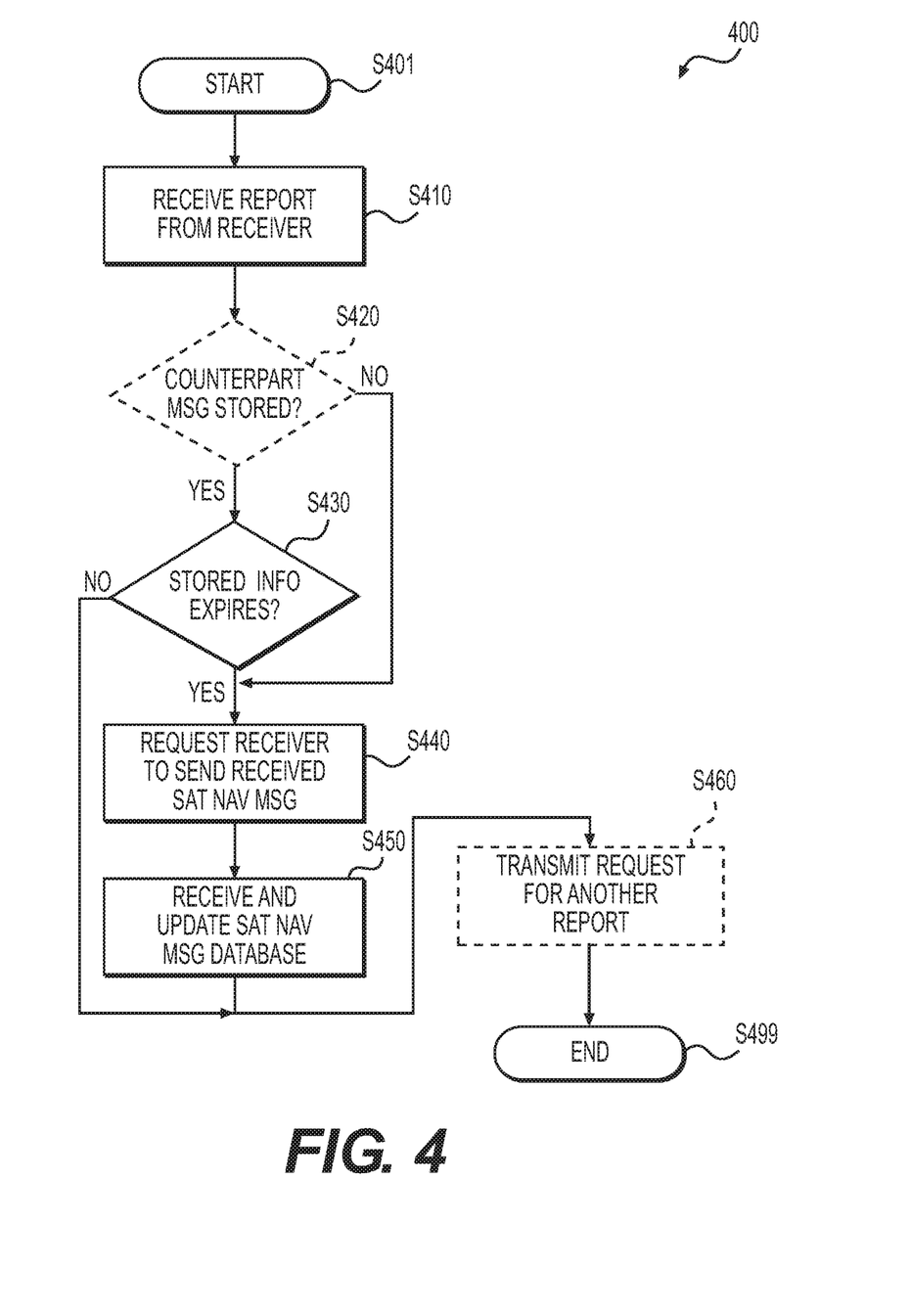
FIG. 4 shows a flowchart outlining a process example 400 for updating a satellite navigation message database according to an embodiment of the disclosure.

FIG. 4 shows a flowchart outlining a process example 400 for updating a satellite navigation message database 150 according to an embodiment of the disclosure. In an example, the process 400 is performed by the server 130 in FIG. 1. The process 400 is illustrated using the server 130 and the receiver 120a and corresponding to the satellite navigation message MSGa received from satellite 110a as an example. The process 400 is applicable to handling satellite navigation messages from other satellites received by the receiver 120a or other receivers 120b and 120c. The process 400 starts at S401 and proceeds to S410.

At S410, the server 130 receives a download report from a receiver. For example, the server 130 receives a download report RPTa from the receiver 120a. The download report RPTa has a data format similar to that of the download report 300 in FIG. 3 and indicates what portions of a satellite navigation message MSGa are currently stored by the receiver 120a. The satellite navigation message MSGa may have a data format similar to the data format 200 in FIG. 2. In some examples, the download report RPTa may include a satellite identifier SAT ID of the corresponding satellite as illustrated in FIG. 3. In an embodiment, the download report RPTa reports the portions of the satellite navigation message MSGa that the receiver directly received from the corresponding satellite 110a.

A receiver 120a, 120b, or 120c may transmit a download report RPTa, RPTb, or RPTc after the receiver 120a, 120b, or 120c is activated for a predetermined period of time. Also, a receiver 120a, 120b, or 120c may transmit a download report RPTa, RPTb, or RPTc after the receiver 120a, 120b, or 120c has been receiving the broadcasted messages for a predetermined number of message cycles. In some embodiments, a receiver 120a, 120b, or 120c may transmit a latest download report RPTa, RPTb, or RPTc upon a request from the server 130.

At S420, in response to the download report RPTa, the server 130 determines whether a satellite navigation message that corresponds to the satellite 110a is stored in the satellite navigation message database 150. When the server 130 determines that a counterpart satellite navigation message is stored in the satellite navigation message database 150 associated with the server 130, the process proceeds to S430. When the server 130 determines that the counterpart satellite navigation message is not stored in the satellite navigation message database 150, the satellite navigation message database 150 will be updated based on the satellite navigation message stored by the receiver 120a, and the process thus proceeds to S440.

In an example, the server may determine whether a counterpart satellite navigation message is stored in the satellite navigation message database 150 based on whether a satellite identifier corresponding to one or more satellite navigation messages stored in the satellite navigation message database 150 matches the satellite identifier SAT ID in the download report RPTa. If a stored satellite navigation message has a satellite identifier that matches the satellite identifier SAT ID in the download report RPTa, the stored satellite navigation message is determined to be corresponds to the satellite 110a associated with the download report RPTa.

In some examples, at least an expired or dummy counterpart satellite navigation message is stored in the satellite navigation message database 150 for each satellite in the satellite positioning system 100, and S420 is thus omitted. In an embodiment where S420 is omitted, the process proceeds from S410 to S430.

At S430, the server 130 further determines whether the ephemeris information (i.e., INFO2 and INFO3) or the almanac information (i.e., INFO4[1:25] and INFO5[1:25]) in the counterpart satellite navigation message, stored in the satellite navigation message database 150 and corresponding to the satellite 110a, has expired or will expire within a first predetermined period of time. When the server 130 determines that the ephemeris information or the almanac information in the counterpart satellite navigation message stored in the satellite navigation message database 150 is valid, and will remain valid within the first predetermined period of time, the satellite navigation message database 150 will not be updated based on the satellite navigation message stored by the receiver 120a at this stage, and the process proceeds to S460. When the server 130 determines that the ephemeris information or the almanac information in the counterpart satellite navigation message stored in the satellite navigation message database 150 has expired or will expire within the first predetermined period of time, the satellite navigation message database 150 will be updated based on the satellite navigation message stored by the receiver 120a, and the process thus proceeds to S440.

The first predetermined period of time can include two or more different settings for requesting the receiver 120a to share different information. For example, in some embodiments, the first predetermined period of time for ephemeris information can be set to a predetermined percentage, such as 10% to 50%, of the validity period of the ephemeris information (e.g., hence set to 24 to 120 minutes for the GPS system). The first predetermined period of time for almanac information can be set to a predetermined percentage, such as 10% to 50%, of the validity period of the almanac information (e.g., hence set to 18 to 90 days for the GPS system).

At S440, when a determination result indicates that the satellite navigation message database 150 should be updated using at least a subset of the satellite navigation message MSGa currently stored by the receiver 120a, the server 130 requests the receiver 120a to transmit the subset of the satellite navigation message MSGa currently stored by the receiver 120a to the server 130. In some examples, the server 130 transmits a request via the data network 140 to the receiver 120a, wherein the request includes information arranged in a format similar to that of the download report 300 in order to specify which data fields the server 130 may need from the receiver 120a in order to update the satellite navigation message database 150.

At S450, the server 130 receives the requested subset of the satellite navigation message MSGa from the receiver 120a via the data network 140 and updates the satellite navigation message database 150 associated with the server 130 based on the received subset of the satellite navigation message MSGa from the receiver 120a.

At S460, the server 130 transmits a request to the receiver 120a via the data network 140 to schedule for the transmission of another download report for the same satellite 110a that the server 130 just processed. In some examples, the another download report can be scheduled based on the validity period of the ephemeris information or the almanac information currently stored in the satellite navigation message database 150. In some embodiments, the another download report can be scheduled for a time when the ephemeris information or the almanac information currently stored in the satellite navigation message database 150 will expire within a second predetermined period of time.

The second predetermined period of time can include two or more different settings for requesting the receiver 120a to send another download report associated with the satellite 110a. The second predetermined period of time may be set to be the same or different from the first predetermined period of time. In at least one example, the server 130 can request the receiver 120a to transmit the latest download reports periodically.

In some embodiments, S460 is omitted. After S460, the process proceeds to S499 and terminates.

Figure 5:
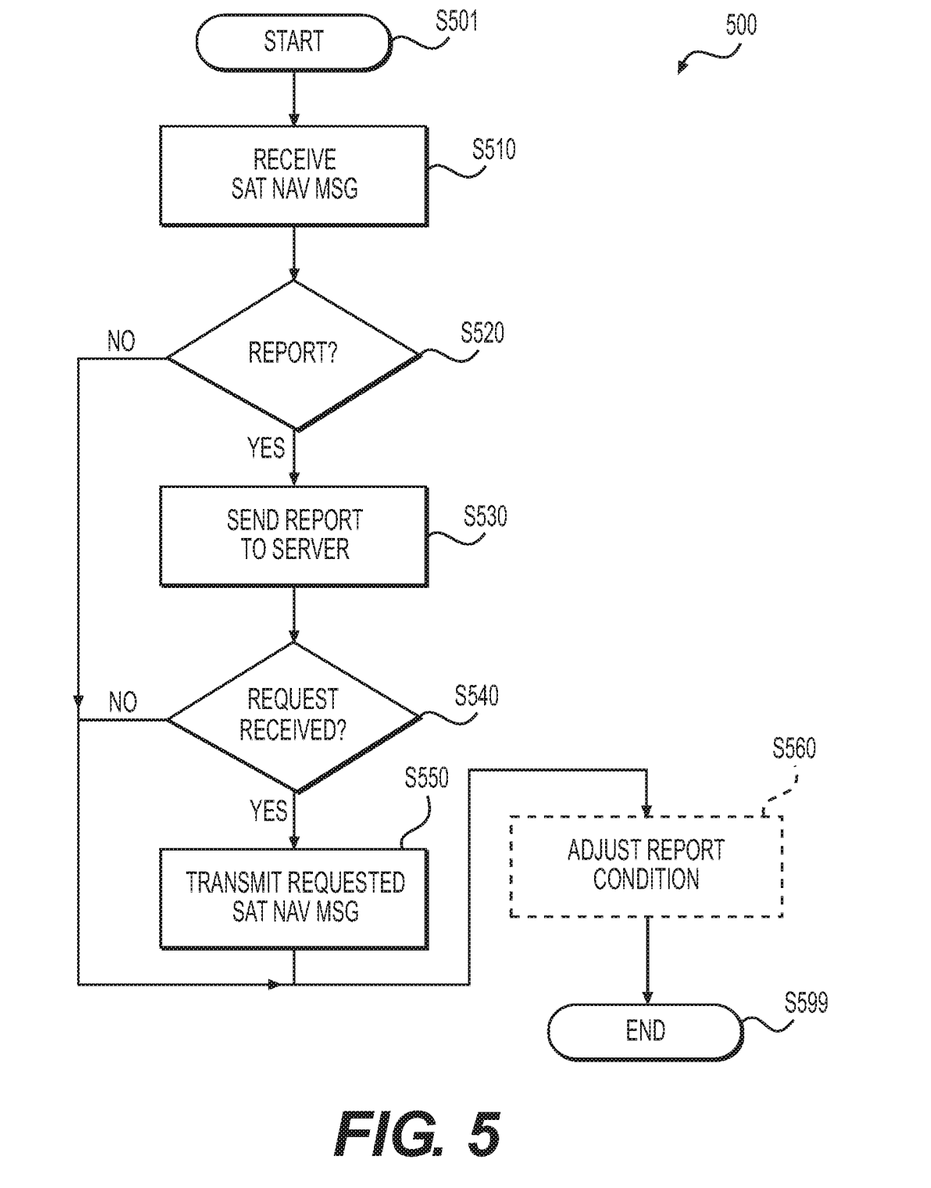
FIG. 5 shows a flowchart outlining a process example 500 for sharing satellite navigation messages by a receiver with a server according to an embodiment of the disclosure.

FIG. 5 shows a flowchart outlining a process example 500 for sharing received information by a receiver with a server according to an embodiment of the disclosure. In an example, the process 500 is performed by the receiver 120a, 120b, and/or 120c in FIG. 1. The process 500 is illustrated using the server 130 and the receiver 120a and corresponding to the satellite navigation message MSGa received from satellite 110a as an example. The process 500 is applicable to handling satellite navigation messages from other satellites received by the receiver 120a or other receivers 120b and 120c. The process 500 starts at S501 and proceeds to S510.

At S510, the receiver 120a receives the broadcasted navigation message MSGa, such as a satellite navigation message according to the data format 200 in FIG. 2, from the satellite 110a. Depending on the location of the receiver 120a with respect to the satellite 110a, the obstacles blocking the line-of-sight between the receiver 120a and the satellite 110a, transmission channel loss, and/or various types of signal interferences and other signal losses, the receiver 120a may not be able to receive a complete satellite navigation message during one or even multiple message broadcasting cycles (e.g., 12.5 minutes each cycle for the GPS system). Therefore, the receiving for some of the information sections INFO1, INFO2, INFO3, INFO4[1:25], and INFO5[1:25] may be unsuccessful, and the receiver 120a thus does not have all information sections stored therein. In some examples, the receiver 120a may further attempt to receive the latest satellite navigation message from the satellites detectable by the receiver 120a as needed.

At S520, the receiver 120a determines whether the receiver 120a should transmit to the server 130 a download report corresponding to the satellite navigation message MSGa received from the satellite 110a. The receiver 120a may transmit a download report RPTa after the receiver 120a is activated for a predetermined period of time or after the receiver 120a has been receiving the broadcasted messages for a predetermined number of message cycles. Also, the receiver 120a may transmit the download report RPTa according to a schedule as requested by the server 130.

When the receiver 120a determines that the receiver 120a should transmit to the server 130 a download report, the receiver 120a generate the download report RPTa having a data format similar to that of the download report 300 in FIG. 3, and the process proceeds to S530. When the receiver 120a determines that the receiver 120a is not scheduled to transmit a download report to the server 130, the process proceeds to S560.

At S530, the receiver 120a transmits the download report RTPa to the server through the data network 140.

At S540, the receiver 120a determines whether the server 130 requests via the data network 140 for sharing at least a subset of the satellite navigation message MSGa stored by the receiver 120a. In one example, the server 130a transmits a transmission request to receiver 120a that includes information arranged in a format similar to the flag section FLAG and/or the header section HEADER of the download report 300 in order to specify which data fields the server 130 needs from the receiver 120a.

When the receiver 120a determines that the receiver 120a has received the request for sharing the satellite navigation message MSGa from the server 130 in response to the download report RPTa, the process proceeds to S550. When the receiver 120a determines that the receiver 120a has not received the request for sharing the satellite navigation message MSGa from the server 130 in response to the download report RPTa, the process proceeds to S560.

At S550, the receiver 120a transmits the requested subset of the satellite navigation message MSGa stored by the receiver 120a to the server 130 via the data network 140.

At S560, the receiver 120a receives a request from the server 130 via the data network 140 with respect to scheduling for another download report for the satellite navigation messages received from the satellite 110a. The request for scheduling another download report corresponding to S460 in FIG. 4, and detailed description is thus omitted.

In some embodiments, S560 is omitted. After S560, the process proceeds to S599 and terminates.

As described above, and also mentioned with reference to FIG. 1, according to one of the embodiments of the present disclosure, when both time and environmental conditions limit a receiver's ability to receive and decode the navigation message successfully, especially in limited sky-view conditions where the satellite signals are weak or in a twinkle, the receiver 120a, 120b, or 120c in FIG. 1 may send a request for the provision of satellite navigation messages of aid to the server 130. In some embodiments, the receiver 120 may send a request together with the download report for retrieving a satellite navigation message stored in the satellite navigation message database 150 associated with the server 130. In some embodiments, the receiver 120 may send a request for retrieving a satellite navigation message stored in the satellite navigation message database 150 associated with the server 130 when the receiver 120 determines that the current navigation message stored in the receiver 120 is stale. In some embodiments, the receiver 120a may send a request on a periodic basis.

The receiver 120 receives a satellite navigation message from the server 130. In some embodiments, the server 130 in response to the request may transmit the portion of the satellite navigation message indicated in the download report as not currently stored by the receiver 120. In some embodiments, the server 130 in response to the request may transmit the satellite navigation message for the entire satellite constellation.

Once the satellite navigation message is received, the receiver 120 checks the valid period of time for the satellite navigation message and then updates the current navigation message stored in the receiver 120.

The receiver 120 predicts and re-constructs the navigation data of any future epoch using the updated navigation message at specific time interval, based on corresponding relation between the navigation data and the time of satellite transfer according to well known re-construction algorithms.

The receiver 120 may calculate Doppler data from the navigation data of any future epoch stored in the receiver at a convenient time for performing a position fix according to well known techniques.

An advantage of the present disclosure is that the provision of satellite navigation messages of aid from the server may be used at the receiver for deriving approximate Doppler information for satellites in view based on the navigation data prediction and re-construction. Estimating the Doppler information reduces Doppler search time, thereby reducing TTFF and improving signal tracking sensitivity and stability.

Another advantage of the present disclosure is that the provision of satellite navigation messages of aid from the server may be used at the receiver for performing long time integration in signal tracking loop to enhance the ability of anti-multipath.

Further aspects of the present invention relate to one or more of the following clauses.

Aspects of the disclosure include a method that includes receiving a download report from a receiver, the download report indicating what portions of a satellite navigation message are currently stored by the receiver, and the receiver receiving the portions of the satellite navigation message from a satellite. The method includes determining whether to update a satellite navigation message database associated with a server based on the portions of the satellite navigation message stored by the receiver. The method also includes, in response to determining that the satellite navigation message database should be updated using a subset of the satellite navigation message currently stored by the receiver, requesting the receiver to transmit the subset of the satellite navigation message currently stored by the receiver to the server, receiving the subset of the satellite navigation message from the receiver by the server, and updating the satellite navigation message database associated with the server based on the received subset of the satellite navigation message from the receiver.

In an embodiment, determining whether to update the satellite navigation message database associated with the server based on the portions of the satellite navigation message stored by the receiver further includes determining whether the satellite navigation message, stored in the satellite navigation message database and corresponding to the satellite, has expired or will expire within a first predetermined period of time.

In an embodiment, the download report further includes a satellite identifier of the satellite, and determining whether to update the satellite navigation message database associated with the server based on the portions of the satellite navigation message stored by the receiver further includes determining whether a satellite identifier corresponding to one or more satellite navigation messages stored in the satellite navigation message database matches the satellite identifier in the download report.

In an embodiment, the method further includes requesting the receiver to transmit another download report when the satellite navigation message, stored in the satellite navigation message database and corresponding to the satellite, will expire within a second predetermined period of time.

In an embodiment, the determining whether to update the satellite navigation message database associated with the server based on the portions of the satellite navigation message stored by the receiver further includes determining that the satellite navigation message database associated with the server is to be updated based on the portions of the satellite navigation message stored by the receiver when the satellite navigation message database does not store a satellite navigation message corresponding to the satellite as indicated in the download report.

In an embodiment, the method further includes requesting the receiver to periodically transmit a latest download report.

In an embodiment, the method further includes receiving a transmission request from the receiver, the transmission request requesting the server to transmit at least a portion of a requested satellite navigation message, and transmitting at least the portion of the requested satellite navigation message to the receiver in response to the transmission request when the portion of the requested satellite navigation message is stored in the satellite navigation message database and has not expired.

In an embodiment, the transmitted portion of the requested satellite navigation message corresponds to a portion of the satellite navigation message indicated in the download report as not currently stored by the receiver.

Aspects of the disclosure include an apparatus that includes a storage device to store a satellite navigation message database and a controller. The controller is configured to receive a download report from a receiver, the download report indicating what portions of a satellite navigation message are currently stored by the receiver, the receiver receiving the portions of the satellite navigation message from a satellite, and to determine whether to update the satellite navigation message database based on the portions of the satellite navigation message stored by the receiver. The controller is further configured, in response to determining that the satellite navigation message database should be updated using a subset of the satellite navigation message currently stored by the receiver, to requests the receiver to transmit the subset of the satellite navigation message currently stored by the receiver to the apparatus, to receive the subset of the satellite navigation message from the receiver, and to update the satellite navigation message database based on the received subset of the satellite navigation message from the receiver.

In an embodiment, the controller further determines whether the satellite navigation message, stored in the satellite navigation message database and corresponding to the satellite, has expired or will expire within a first predetermined period of time.

In an embodiment, the download report further includes a satellite identifier of the satellite, and the controller further determines whether a satellite identifier corresponding to one or more satellite navigation messages stored in the satellite navigation message database matches the satellite identifier in the download report.

In an embodiment, the controller further requests the receiver to transmit another download report when the satellite navigation message, stored in the satellite navigation message database and corresponding to the satellite, will expire within a second predetermined period of time.

In an embodiment, the controller further determines that the satellite navigation message database is to be updated based on the portions of the satellite navigation message stored by the receiver when the satellite navigation message database does not store a satellite navigation message corresponding to the satellite as indicated in the download report.

In an embodiment, the controller further requests the receiver to periodically transmit a latest download report.

In an embodiment, the controller further receives a transmission request from the receiver, the transmission request requesting the apparatus to transmit at least a portion of a requested satellite navigation message, and transmits at least the portion of the requested satellite navigation message to the receiver in response to the transmission request when the portion of the requested satellite navigation message is stored in the satellite navigation message database and has not expired.

In an embodiment, the transmitted portion of the requested satellite navigation message corresponds to a portion of the satellite navigation message indicated in the download report as not currently stored by the receiver.

Aspects of the disclosure include a system that includes a receiver and a server. The receiver is configured to receive portions of a satellite navigation message from a satellite and to transmit a download report, the download report indicating the portions of the satellite navigation message currently stored by the receiver. The server is configured to receive the download report from the receiver, and to determine whether to update a satellite navigation message database associated with the server based on the portions of the satellite navigation message stored by the receiver. The server is further configured, in response to determining that the satellite navigation message database should be updated using a subset of the satellite navigation message currently stored by the receiver, to request the receiver to transmit the subset of the satellite navigation message currently stored by the receiver to the server, to receive the subset of the satellite navigation message from the receiver, and to update the satellite navigation message database based on the received subset of the satellite navigation message from the receiver.

In an embodiment, the server further determines whether a satellite navigation message, stored in the satellite navigation message database and corresponding to the satellite, has expired or will expire within a predetermined period of time.

In an embodiment, the receiver is a stationary device disposed at a predetermined location.

In an embodiment, the receiver is a mobile device.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
    receiving a download report from a receiver, the download report indicating presence or absence of respective information sections of sub-frames of a satellite navigation message currently stored by the receiver, the receiver receiving stored information sections of the satellite navigation message that are indicated as presence in the download report from a satellite;
    determining whether to update a satellite navigation message database associated with a server using a subset of the stored information sections based on the download report from the receiver; and
    in response to determining that the satellite navigation message database is to be updated using the subset of the stored information sections:
        requesting the receiver to transmit the subset of the stored information sections to the server,
        receiving the subset of the stored information sections from the receiver by the server, and
        updating the satellite navigation message database associated with the server based on the received subset of the stored information sections from the receiver.

2. The method of claim 1, wherein determining whether to update the satellite navigation message database associated with the server based on the download report from the receiver further comprises:
    determining whether the satellite navigation message, stored in the satellite navigation message database and corresponding to the satellite, has expired or will expire within a first predetermined period of time.

3. The method of claim 2, wherein
    the download report further includes a satellite identifier of the satellite; and
    determining whether to update the satellite navigation message database associated with the server based on the download report from the receiver further comprises:
        determining whether a satellite identifier corresponding to one or more satellite navigation messages stored in the satellite navigation message database matches the satellite identifier in the download report.

4. The method of claim 2, further comprising:
    requesting the receiver to transmit another download report when the satellite navigation message, stored in the satellite navigation message database and corresponding to the satellite, will expire within a second predetermined period of time.

5. The method of claim 1, wherein the determining whether to update the satellite navigation message database associated with the server based on the download report from by the receiver further comprises:
- determining that the satellite navigation message database associated with the server is to be updated using the subset of the stored information sections stored by the receiver when the satellite navigation message database does not store a satellite navigation message corresponding to the satellite as indicated in the download report.

6. The method of claim 1, further comprising:
requesting the receiver to periodically transmit a latest download report.

7. The method of claim 1, further comprising:
- receiving a transmission request from the receiver, the transmission request requesting the server to transmit at least a portion of a requested satellite navigation message; and
- transmitting at least the portion of the requested satellite navigation message to the receiver in response to the transmission request when the portion of the requested satellite navigation message is stored in the satellite navigation message database and has not expired.

8. The method of claim 7, wherein the transmitted portion of the requested satellite navigation message corresponds to information sections of the sub-frames of the satellite navigation message indicated in the download report as not currently stored by the receiver.

9. An apparatus, comprising:
- a storage device configured to store a satellite navigation message database; and
- control circuitry configured to:
  - receive a download report from a receiver, the download report indicating presence or absence of respective information sections of sub-frames of a satellite navigation message currently stored by the receiver, the receiver receiving stored information sections of the satellite navigation message that are indicated as presence in the download report from a satellite;
  - determine whether to update the satellite navigation message database using a subset of the stored information sections based on the download report from the receiver; and
  - in response to determining that the satellite navigation message database is to be updated using the subset of the stored information sections:
    - request the receiver to transmit the subset of the stored information sections,
    - receive the subset of the stored information sections from the receiver, and
    - update the satellite navigation message database based on the received subset of the stored information sections from the receiver.

10. The apparatus of claim 9, wherein the control circuitry is further configured to determine whether the satellite navigation message, stored in the satellite navigation message database and corresponding to the satellite, has expired or will expire within a first predetermined period of time.

11. The apparatus of claim 10, wherein
the download report further includes a satellite identifier of the satellite; and
the control circuitry is further configured to determine whether a satellite identifier corresponding to one or more satellite navigation messages stored in the satellite navigation message database matches the satellite identifier in the download report.

12. The apparatus of claim 10, wherein the control circuitry is further configured to request the receiver to transmit another download report when the satellite navigation message, stored in the satellite navigation message database and corresponding to the satellite, will expire within a second predetermined period of time.

13. The apparatus of claim 9, wherein the control circuitry is further configured to determine that the satellite navigation message database is to be updated using the subset of the stored information sections stored by the receiver when the satellite navigation message database does not store a satellite navigation message corresponding to the satellite as indicated in the download report.

14. The apparatus of claim 9, wherein the control circuitry is further configured to request the receiver to periodically transmit a latest download report.

15. The apparatus of claim 9, wherein the control circuitry is further configured to:
- receive a transmission request from the receiver, the transmission request requesting the apparatus to transmit at least a portion of a requested satellite navigation message; and
- transmit at least the portion of the requested satellite navigation message to the receiver in response to the transmission request when the portion of the requested satellite navigation message is stored in the satellite navigation message database and has not expired.

16. The apparatus of claim 15, wherein the transmitted portion of the requested satellite navigation message corresponds to information sections of the sub-frames of the satellite navigation message indicated in the download report as not currently stored by the receiver.

17. A system, comprising:
- a receiver configured to:
  - receive and store information sections of sub-frames of a satellite navigation message from a satellite; and
  - transmit a download report, the download report indicating presence or absence of respective information sections of the sub-frames of the satellite navigation message currently stored by the receiver; and
- a server configured to:
  - receive the download report from the receiver;
  - determine whether to update a satellite navigation message database associated with the server using a subset of the stored information sections stored by the receiver based on the download report from the receiver; and
  - in response to determining that the satellite navigation message database is to be updated using the subset of the stored information sections stored by the receiver:
    - request the receiver to transmit the subset of the stored information sections,
    - receive the subset of the stored information sections from the receiver, and
    - update the satellite navigation message database based on the received subset of the stored information sections from the receiver.

18. The system of claim 17, wherein the server is further configured to determine whether a satellite navigation message, stored in the satellite navigation message database and corresponding to the satellite, has expired or will expire within a predetermined period of time.

19. The system of claim 17, wherein the receiver is a stationary device disposed at a predetermined location.

20. The system of claim 17, wherein the receiver is a mobile device.

* * * * *